No. 766,843. PATENTED AUG. 9, 1904.
F. A. RICKARD.
CENTERING AND DRILLING ATTACHMENT FOR LATHES.
APPLICATION FILED AUG. 31, 1903.
NO MODEL.

Witnesses
M. E. Corder
Geo. E. Few

Inventor
F. A. Rickard
by Milo B. Stevens & Co.
Attorneys

No. 766,843. Patented August 9, 1904.

UNITED STATES PATENT OFFICE.

FRED ALONZO RICKARD, OF LOWELL, MASSACHUSETTS, ASSIGNOR OF ONE-HALF TO H. FRANCIS KIERNAN, OF COLLINSVILLE, MASSACHUSETTS.

CENTERING AND DRILLING ATTACHMENT FOR LATHES.

SPECIFICATION forming part of Letters Patent No. 766,843, dated August 9, 1904.

Application filed August 31, 1903. Serial No. 171,334. (No model.)

*To all whom it may concern:*

Be it known that I, FRED ALONZO RICKARD, a citizen of the United States, residing at Lowell, in the county of Middlesex and State of Massachusetts, have invented certain new and useful Improvements in Centering and Drilling Attachments for Lathes; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a drilling and centering attachment for lathes.

The object of the invention is to provide an improved centering-chuck holder to hold a chuck for a drilling-tool, particularly pivot-drills and the like in watchmaking, and to center the work to the drill before the pressure is applied.

The invention is illustrated in the accompanying drawings, in which—

Figure 1:
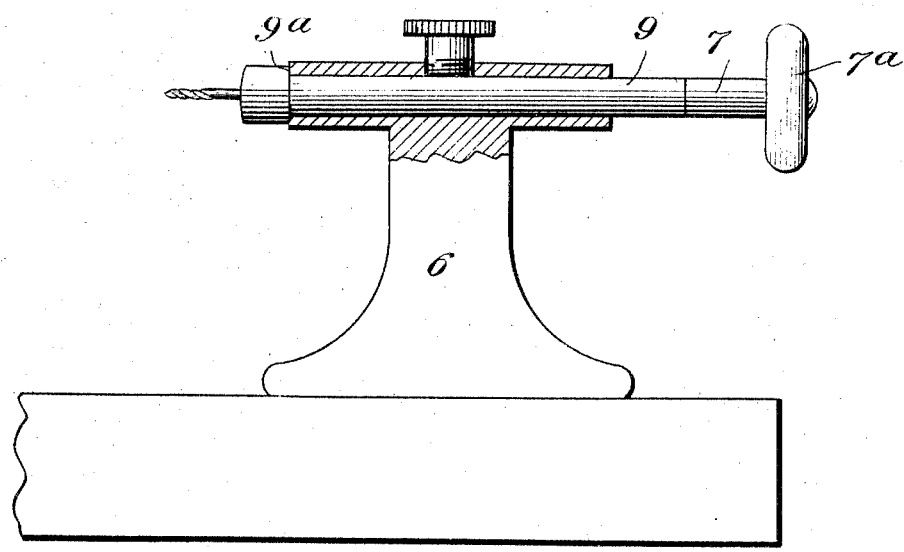
Figure 2:
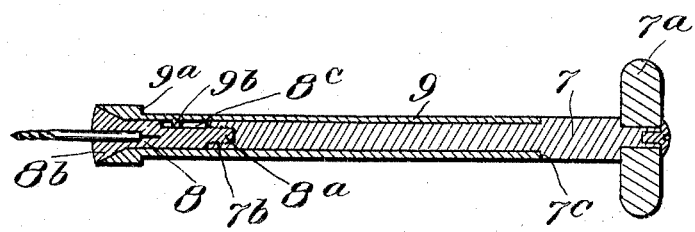

Figure 1 is an elevation of the tail-stock of a lathe, partly in section, showing the invention applied thereto; and Fig. 2 is a longitudinal section of the device removed from the tail-stock.

Referring specifically to the drawings, 6 represents the tail-stock of an ordinary watchmaker's lathe. My invention fits in the bore of the tail-stock. It comprises a drawing-spindle 7, having at its rear end a knob $7^a$. The front end of the spindle has an internal screw-thread $7^b$ to receive the threaded end $8^a$ of the split conical drill-chuck 8. The spindle fits within a bearing-sleeve 9, the outer end of said sleeve having a conical socket in which the tapering head $8^b$ of the chuck fits. A pin $9^b$ on the inside of the sleeve sets in a slot $8^c$ in the chuck to prevent relative rotation of the same. The sleeve is slidable in the tail-stock between the shoulder $9^a$ thereon and the knob $7^a$ on the spindle, and the rear end of the sleeve abuts against a shoulder $7^c$ on the spindle, which holds the respective parts together. The spindle is free to turn in the bearing-sleeve to draw in the chuck by engagement of the threads at $7^b$ with the end of the chuck. The drill-bit is removed by unscrewing the spindle, which will allow the chuck to open and release the bit.

The device is readily applied to any standard watchmaker's lathe, it being necessary only to remove the centering-spindle from the tail-stock. The sleeve 9 is first passed through the bore from the left. The spindle 7 is then placed in the sleeve from the right and screwed into the threaded end of the chuck, the conical head of which draws together to bind the bit.

In operation the work is chucked on the head-stock and the tail-stock adjusted on the bed of the lathe. Pressure against the rear end of the spindle will advance the drill to center the work, after which the drill may be used by operating the head-stock. The bearing-sleeve of the spindle extends throughout the entire length of the tail-stock bore, and thus affords a wide and steady support for the drill, enabling the drilling and centering operations to be accurately performed.

Having thus described my invention, what is claimed as new, and desired to be secured by Letters Patent, is—

The combination with a lathe-stock, of a sleeve slidable lengthwise in the bore thereof and having a conical recess in the front end, and an exterior shoulder on the front end arranged to abut against the stock, a conical chuck fitting the recess, and a drawing-spindle extending through the sleeve and screwed into the rear end of the chuck and having a shoulder abutting against the rear end of the sleeve.

In testimony whereof I affix my signature in presence of two witnesses.

FRED ALONZO RICKARD.

Witnesses:
JOS. T. L. BREENAN,
WILLIAM F. CURTIN.